United States Patent
Yoshimura et al.

(10) Patent No.: US 6,716,023 B2
(45) Date of Patent: Apr. 6, 2004

(54) THERMAL PRESSURE DIE FOR FORMING SEAT

(75) Inventors: Masakazu Yoshimura, Akishima (JP); Tatsuo Majima, Akishima (JP)

(73) Assignee: Tachi-S Co., Ltd., Tokyo (JP)

( * ) Notice: Subject to any disclaimer, the term of this patent is extended or adjusted under 35 U.S.C. 154(b) by 332 days.

(21) Appl. No.: 09/828,207

(22) Filed: Apr. 9, 2001

(65) Prior Publication Data
US 2002/0001635 A1 Jan. 3, 2002

(51) Int. Cl.$^7$ ............................................. B29C 43/10
(52) U.S. Cl. ...................... 425/520; 425/403; 425/408; 425/411; 264/313
(58) Field of Search ................... 425/DIG. 44, 403, 425/89, 520, 542, 408, 411; 249/111, 134; 264/313; 156/581, 583.1

(56) References Cited

U.S. PATENT DOCUMENTS

| 1,492,694 | A | * | 5/1924 | Meloche | 249/111 |
| 4,929,304 | A | * | 5/1990 | Urai et al. | 156/245 |
| 4,979,890 | A | * | 12/1990 | Bracesco | 425/399 |
| H001654 | H | * | 6/1997 | Rounds | 264/511 |
| 5,714,179 | A | * | 2/1998 | Goodridge et al. | 425/394 |
| 5,743,996 | A | * | 4/1998 | Sakamoto et al. | 156/581 |
| 6,083,447 | A | * | 7/2000 | Turner | 264/401 |

FOREIGN PATENT DOCUMENTS

| JP | 4-229259 A | 8/1992 |
| JP | 7-96087 A | 4/1995 |

* cited by examiner

Primary Examiner—Robert Davis
Assistant Examiner—Joseph S Del Sole
(74) Attorney, Agent, or Firm—Browdy and Neimark

(57) ABSTRACT

A thermal pressure die for pressing and heating a trim cover assembly for automotive seat into a desired uneven configuration, the trim cover assembly having a decoratively finished outer surface with aesthetic solid or projecting decorative patterns defined thereon. A protection element of elastic and heat insulation property is provided on an uneven die surface of the die which is to be brought into pressing contact with such decoratively finished outer surface of trim cover assembly. Hence, the solid or projecting decorative patterns on the trim cover assembly outer surface are protected by the protection element against any deformation due to pressure and heating generated in the thermal pressure die.

7 Claims, 4 Drawing Sheets

THERMAL PRESSURE DIE FOR FORMING SEAT

BACKGROUND OF INVENTION

1. Field of the Invention

The present invention relates to a thermal pressure die for applying heat and pressure to a piece of trim cover assembly in the process for forming an automotive seat. More particularly, the invention is directed to a thermal pressure die which is operable to heat and press a piece of trim cover assembly into a desired uneven shape of trim cover assembly for automotive seat, or operable to heat and press a sheet of trim cover assembly against an uneven surface of foam cushion member via adhesive agent into a desired uneven configuration of bonded seat unit for automotive seat.

2. Description of Prior Art

Most of automotive seats are configured unevenly at their seating areas so that an occupant seated therein may feel a good and comfortable supportive touch. Typically, the automotive seat is so configured to have a central recessed area for supporting the buttock portion of the occupant and a pair of side bolster areas defined protuberant on the opposite sides of such central recessed area to support both lateral thigh portions of the occupant.

In general, in forming this sort of seat, a predetermined uneven shape of trim cover assembly, pre-formed by sewing together plural cover materials, is securely attached upon the corresponding uneven outer surfaces of foam cushion member.

As a means for forming the seat, there has been known a thermal pressure die device. The thermal pressure die device basically includes a lower stationary die and an upper die movable vertically to and from the lower stationary die, such that the upper die applies pressure and heat in a direction to the lower die. The die device per se may be arranged to form a trim cover assembly in an uneven shape corresponding to a predetermined outer uneven shape of seat, or to pressingly bond a trim cover assembly against an uneven surfaces of foam cushion member in conformity therewith, as required.

In both of those two kinds of thermal pressure dies, the trim cover assembly is subjected to a great pressure while being heated, which means that some local areas of the trim cover assembly are intensively expanded due to such great pressure and heat. This local expansion phenomena has been recognized as a cause for degrading a decorative outer surface layer of trim cover assembly which contains rectilinear decorative patterns, planar decorative patterns, solid decorative patterns with plural independent projections, a raised or gigged texture material, and so forth. Thus, it is highly possible that, upon being subjected to a great pressure and heat, a local portion of such delicate areas of trim cover assembly will be deformed to leave an objectionable point therein and impair the aesthetic appearance of resulting seat.

SUMMARY OF THE INVENTION

In view of the above-stated drawbacks, it is a primary purpose of the present invention to an improved thermal pressure die which permits for shaping a trim cover assembly for automotive seat into a desired uneven configuration while avoiding any deformation of the solid or projecting decorative surface of trim cover assembly.

To achieve such purpose, in accordance with the present invention, there is basically provided a thermal pressure die wherein a protection means of elastic and heat insulation property is provided on an uneven die surface of the die which is to be brought into pressing contact with a trim cover assembly.

Accordingly, the elasticity of the protection means absorbs an impact of pressure given from the die to the corresponding region of trim cover assembly, thereby reducing the pressure to a degree which avoids extremely forcible extension and deformation of the solidly textured surface of trim cover assembly, such as a raised or gigged surface, a solidly patterned surface with a great number of decorative projections, or geometrically patterned surface. Further, the heat insulation property of protection means serves to lessen a high temperature of heat heat insulation property of protection means serves to lessen a high temperature of heat imparted to the decorative surface of trim cover assembly, thereby protecting the same against deformation due to the heating.

Preferably, the protection means may comprise a protection element in a sheet form, which is fixedly attached on the uneven die surface. More preferably, such protection element be formed from a urethane foam material of about 2 mm thickness.

In one aspect of the invention, a projection adapted to form a decorative groove in the trim cover assembly may be formed on the uneven die surface such as to surround a part of that particular uneven die surface, and the protection means be provided on such particular part of uneven die surface surrounded by the projection.

Other features and advantages of the present invention will become apparent from reading of the description hereinafter with reference to the annexed drawings.

DETAILED DESCRIPTION OF PREFERRED EMBODIMENT OF THE INVENTION

FIGS. 1 through 8 illustrate exemplary non-distinctive embodiments of the present invention which are applicable not only to a thermal pressure die device of a normal type for heating and pressing one piece of trim cover assembly into an uneven shape conforming to a predetermined contour of automotive seat, but also to a thermal pressure bonding die device for pressingly and adhesively bonding one piece of trim cover assembly, while applying heat thereto, to the uneven surfaces of foam cushion member preformed in a predetermined shape of automotive seat.

Figure 1:
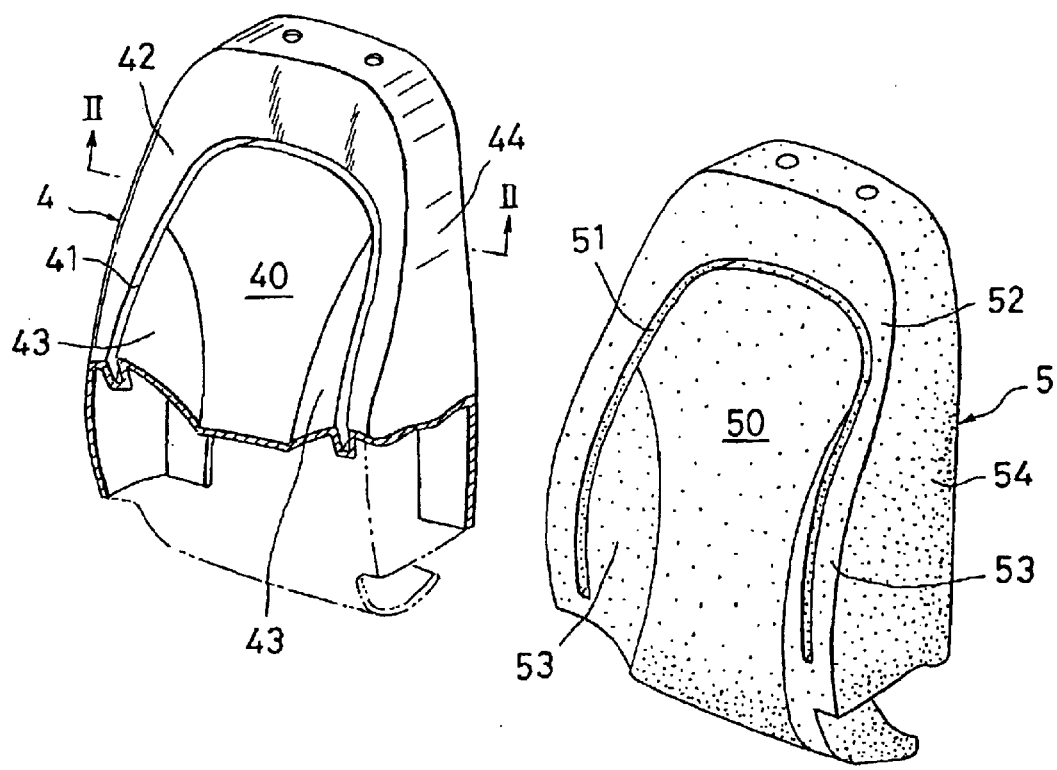
FIG. 1 is a schematic perspective view showing a trim cover assembly and a foam cushion member which are used in a thermal pressure die of the present invention.
Figure 2:
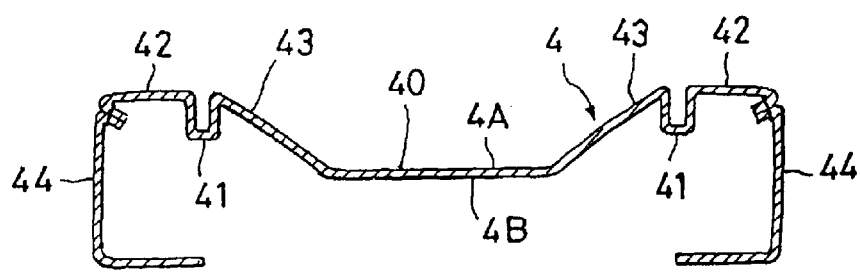
FIG. 2 is a sectional view taken along the line II—II in FIG. 1.
Figure 3:
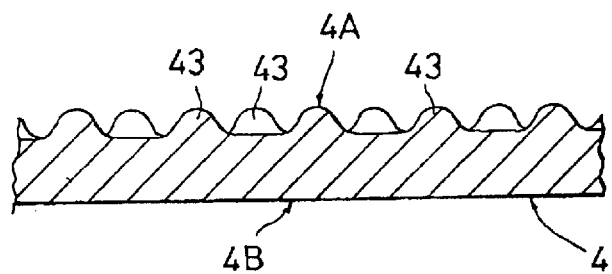
FIG. 3 is a partly enlarged sectional view of the trim cover assembly, showing a great number of decorative projections formed on its outer surface.

Referring first to FIGS. 1 to 3, there is shown a resulting trim cover assembly (4) formed by a thermal pressure die device of normal type stated above, which is a known ordinary die device. The resulting trim cover assembly (4) is depicted as having an uneven surface since it has a recessed cover portion (40) defined in the central region thereof and has a pair of bolster side cover portions (43) (43) defined on the opposite sides of the recessed cover portion (40), with a generally U-shaped decorative groove (41) extending along the peripheral region thereof. Before being so shaped, an original or initial flat state of the trim cover assembly (4) per se is typically provided in such a basic layout wherein a central cover region is defined centrally thereof at (40) and a peripheral side cover region is defined at (42) to circumscribe the central cover region, as known in the art pertaining to a seat cover assembly.

Figure 6:
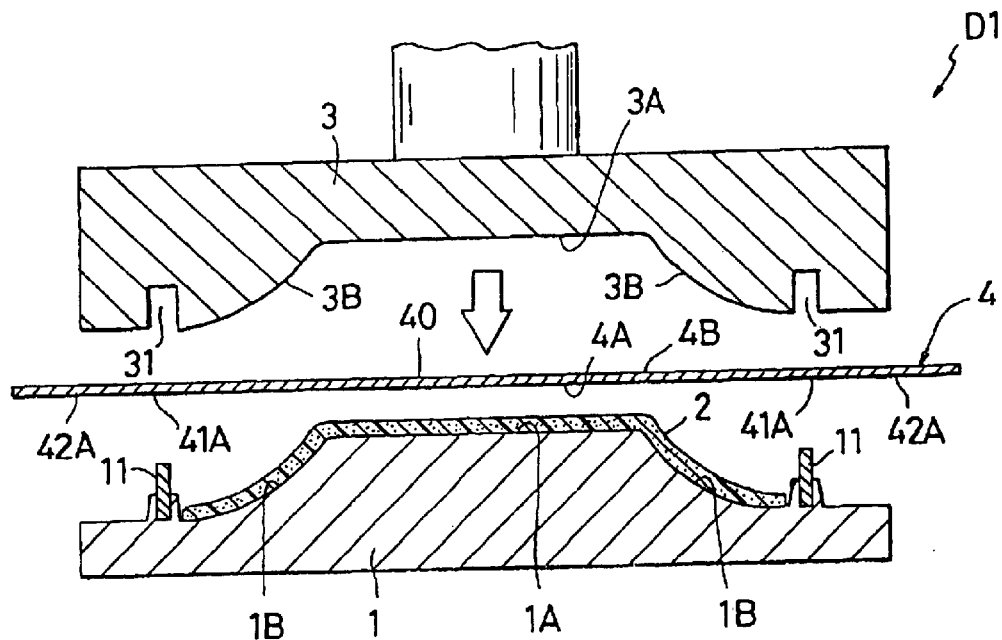
FIG. 6 is a sectional view of a normal type of thermal pressure die device to which the present invention is applied, showing how the trim cover assembly is pressed between upper and lower dies of the die device.
Figure 8:
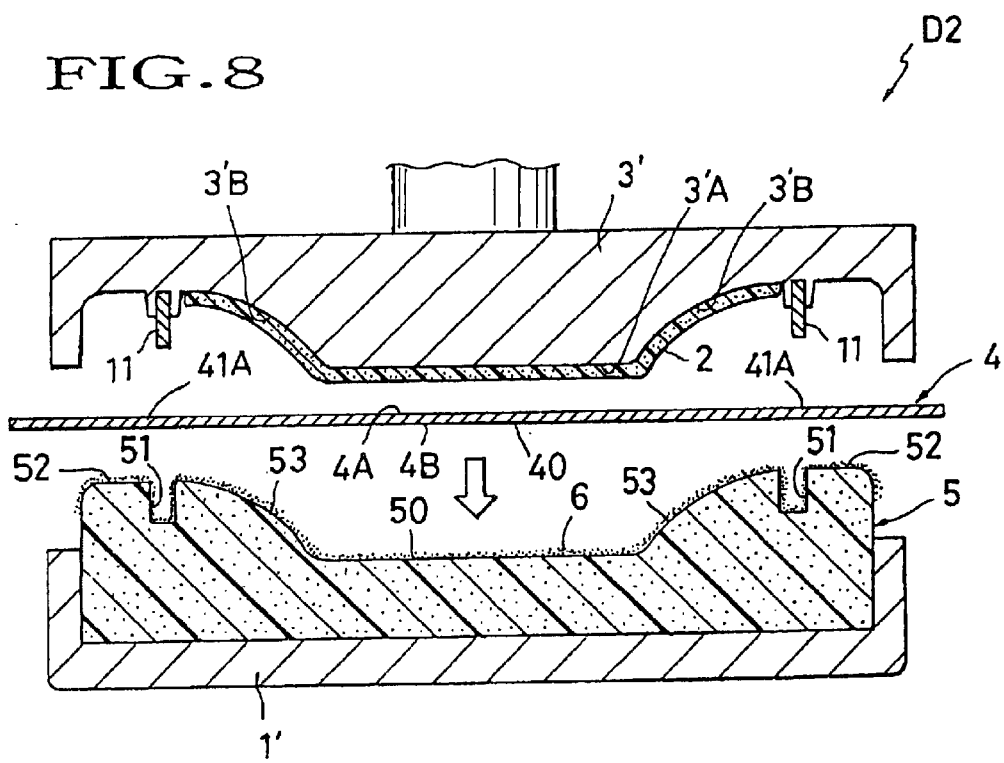
FIG. 8 is a sectional view of a thermal pressure bonding die device to which the present invention is applied, showing how the trim cover assembly is pressingly and adhesively bonded to an uneven surface of the foam cushion member by this particular mode of die device.

Such initial flat state of trim cover assembly (4) can be seen from FIGS. 6 and 8. As required, a separate or integral extension region may be defined from the peripheral cover region to provide a lateral complementary cover section (44) adapted to cover the peripheral lateral wall of a foam cushion member (5) to be described later.

The initial flat state of trim cover assembly (4) used in the present invention is of an extensible property and formed from one piece of solidly textured material or cloth with plural decorative patterns formed on its outer surfaces, such as a piece of waffle texture material with linear or checker patterns given thereon, a piece of raised or gigged fabric material, or a piece of embossed or cameo textured material. For instance, as best shown in FIG. 3, the initial flat state of trim cover assembly (4) may be of such solidly textured type that has a great number of small warty decorative projections (43) defined on its outer surface (4A).

One piece of such flat state of trim cover assembly (4) may be subjected to thermal pressure molding process, using one of the foregoing two kinds of thermal pressure die devices. It is noted, however, that those pressure die devices, as will be explained below, are not limited to the illustrated embodiment, but any other modes of thermal pressure die devices may be utilized insofar as they serve the purposes contemplated by the present invention.

Figure 7:
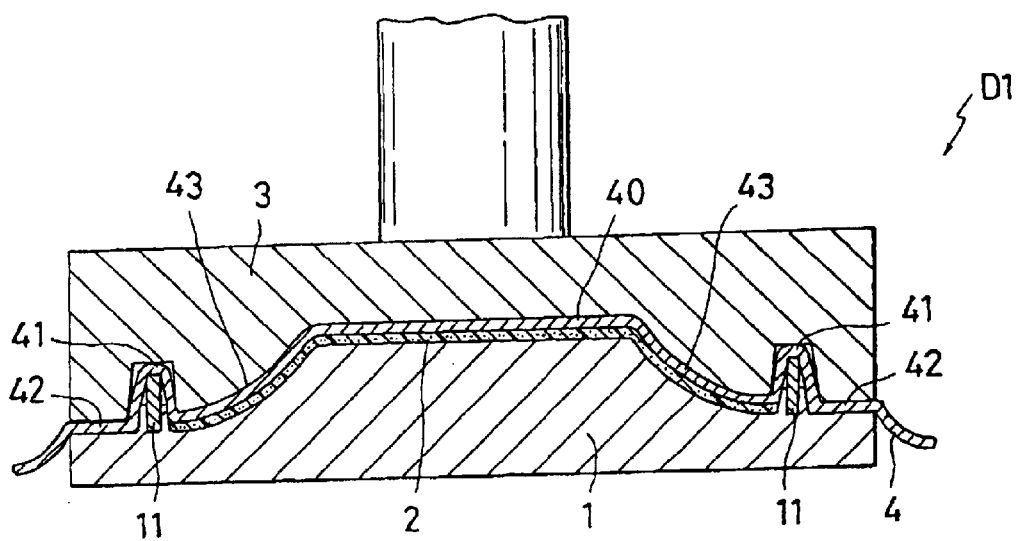
FIG. 7 is a sectional view of the thermal pressure die device, wherein the trim cover assembly is shown as having being pressed between the upper and lower dies.

Referring to FIGS. 6 and 7, there is illustrated a normal type of thermal pressure die device stated earlier, which is designed to shape the initial flat state of trim cover assembly (4) into the unevenly configured trim cover assembly (4) described above. In this mode, the die device is generally designated by (D1) and comprises a lower die (1) and an upper die (2) movable vertically to and from the lower die (1). As seen from FIGS. 4 and 6, the lower die (1) has an uneven working die surface in which a protuberant die surface area (1A) is formed centrally thereof and a pair of recessed die surface areas (1B) (1B) are formed symmetrically relative to the protuberant die surface area (1A). Further, such die surface of lower die (1) includes a generally U-shaped projection (11) erecting and extending on and along the peripheral end portion thereof. On the other hand, the upper die (3) also has an uneven working die surface contoured in conformity with that of the lower die (1). That is, while only shown in the cross-section in FIGS. 6 and 7, it is to be seen that the upper die (3) has a central recessed die surface area (3A) to mate with the protuberant die surface area (1A) of the lower die (1); a pair of protuberant die surface areas (3B) (3B), each being to mate with the two recessed die surface areas (1B) (1B) of lower die (1), respectively; and a generally U-shaped groove (31) to mate with the generally U-shaped projection (11) of lower die (1). Though not shown, a heater or suitable heating means is incorporated in one or both of the upper and lower dies (1) (3).

Figure 4:
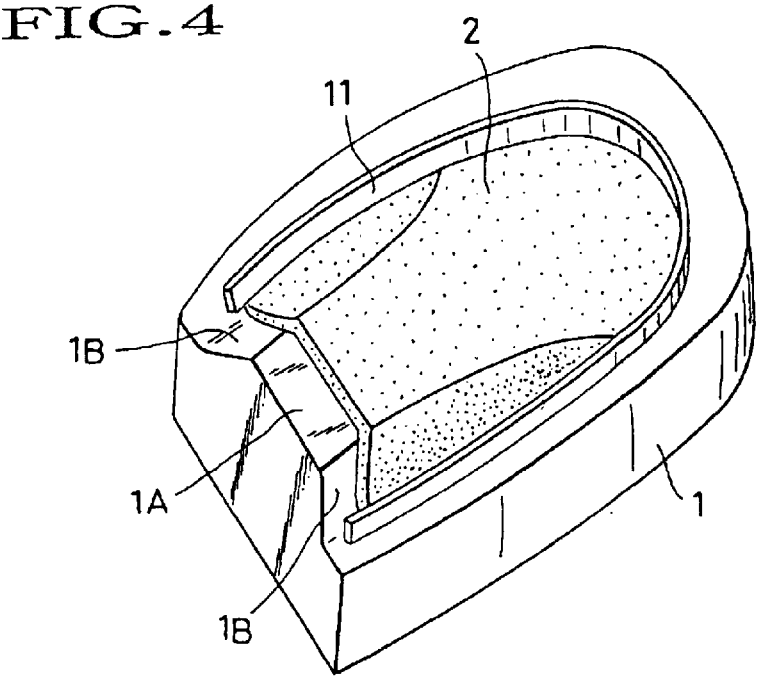
FIG. 4 is a schematic perspective view showing a principal part of the thermal pressure die in accordance with the present invention.
Figure 5:
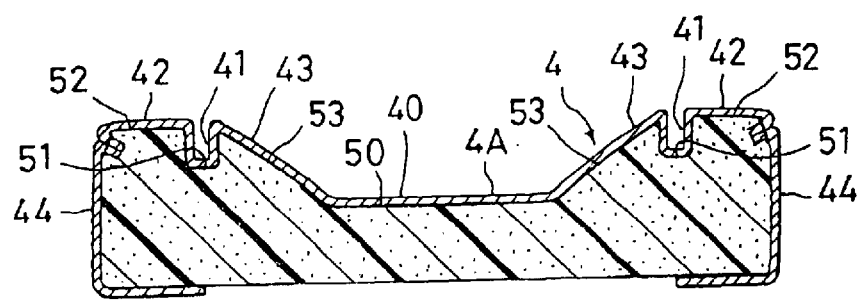
FIG. 5 is a sectional view which serves to show a resulting trim cover assembly or a resulting bonded unit of trim cover assembly and foam cushion member.

According to the present invention, a protection means is provided in the die device (D1) at a point where a tension is caused in the trim cover assembly being pressed and heated between the upper and lower dies (1) (3), thereby protecting the trim cover assembly (4) against deformation in its decorative surfaces. Such protection means is embodied by a piece of protection element (2) having an elastic and heat insulation property. Preferably, the protection element (2) is formed from a urethane foam material. Particularly, a unitary sheet of urethane foam material of about 2 mm thickness may be recommended. It is important that such protection element, i.e. one unitary sheet of urethane foam material (2), be fixedly attached on the particular uneven die surface region of lower die (1) which will strongly work with the mating die surface region of upper die (3) to give a tension to the initial flat state of trim cover assembly (4) through a pressure applied thereto from the upper die (3). In the present mode, as best seen in FIG. 4, such urethane foam protection element (2) is fixedly attached on the whole local area of lower die (1) surrounded by the U-shaped projection (11), such as to overlie the entirety of both central protuberant die surface area (1A) and two recessed die surface areas (1B) (1B). This full overlying of the protection element (2) is effective in the illustrated embodiments wherein the trim cover assembly (4) has such acutely pressed points (41A) (42A) to be caused by a sharp engagement between the U-shaped projection and groove (11) (31), in which case, a greatest tension is given to the adjacent local areas of the trim cover assembly (4), i.e. at two bolster cover regions (43) and peripheral cover region (42) to be defined therein. However, in the case where such U-shaped projection and groove (11) (31) are not provided in the die device (D1), the protection element (2) may be reduced in size relative to the illustrated one and fixed on a more limited local die surface area of lower die (1) which will mate with the corresponding die surface area of upper die (3) to intensively give a tension to the trim cover assembly (4).

In operation, as indicated by the arrow of FIG. 6, the upper die (3) is lowered to press the initial flat state of trim cover assembly (4) against the lower die (1) while heat is being applied thereto. The pressure degree and heating temperature degree are preset as usually done without any particular adjustment. Due to the pressure and heat being applied, the predetermined local regions of the trim cover assembly (4), which is to be press formed, is extended and pressed between the upper and lower dies (3) (1) in conformity with the uneven die surfaces (3A, 3B, 1A, 1B) of the two dies being mated together, as shown in FIG. 7. Naturally, a tension is caused in the trim cover assembly (4) at a point where the central recessed and two protuberant die surface areas (3A) (3B) are respectively brought to mating conformity with the central protuberant and two recessed die surface areas (1A) (1B). But, the elasticity of the protection element (2) absorbs an impact of pressure given from the upper lower (3) to the corresponding region of trim cover assembly (4), thereby reducing the pressure to a degree which avoids deformation of the solidly textured surface of trim cover assembly (4), i.e. the great number of decorative projections (43). Further, the heat insulation property of the protection element (2) serves to lessen a high temperature of heat imparted to the decorative surface of trim cover assembly (4), thereby protecting the same against deformation due to the heating. Accordingly, all such decorative projections (43) are protected against collapse due to both pressure and heating. Of course, those buffer and insulation effects are also applied to any otherwise textured surface of trim cover assembly (4). For instance, all raised fibers in the gigged surfaces used in the trim cover assembly (4) are protected by the protection element (2) against bending, or a geometric decorative patterns formed on the trim cover assembly (4) are protected by the element (2) against any objectionable deformation.

The resulting uneven shape of trim cover assembly (4) is taken out from both two dies (1) (3) and then securely attached upon a foam cushion member (5) preformed in the corresponding uneven configuration (for seat back), such that all the resulting uneven cover portions of trim cover assembly (4) (i.e. the recessed cover portion (40), peripheral cover portion (42), two bolster side cover portions (43) and U-shaped groove (41) for instance) are fit and affixed on all the mating uneven surface regions of the foam cushion member (5) (i.e. the central recessed region (50), peripheral portion (52), two bolster side portions (53) and U-shaped groove (51) for instance). In the shown embodiment, with particular reference to FIGS. 1 and 2, the resulting trim cover assembly (4) includes a complementary lateral cover section (44) which is sewn with and along the edges of the peripheral cover portion (42), extending generally at a right angle inwardly therefrom, which is adapted to cover the corresponding peripheral wall portion (54) of the cushion member (5). Thus, as understandable from FIG. 1 and 5, there is produced a seat back (SB) in which the forwardly and laterally facing surfaces of cushion member (5) are covered with the resulting shaped trim cover assembly (4). Of course, the final product obtained is not limited to the seat back, but may be a seat cushion, or any other seat components for automotive seat.

Figure 9:
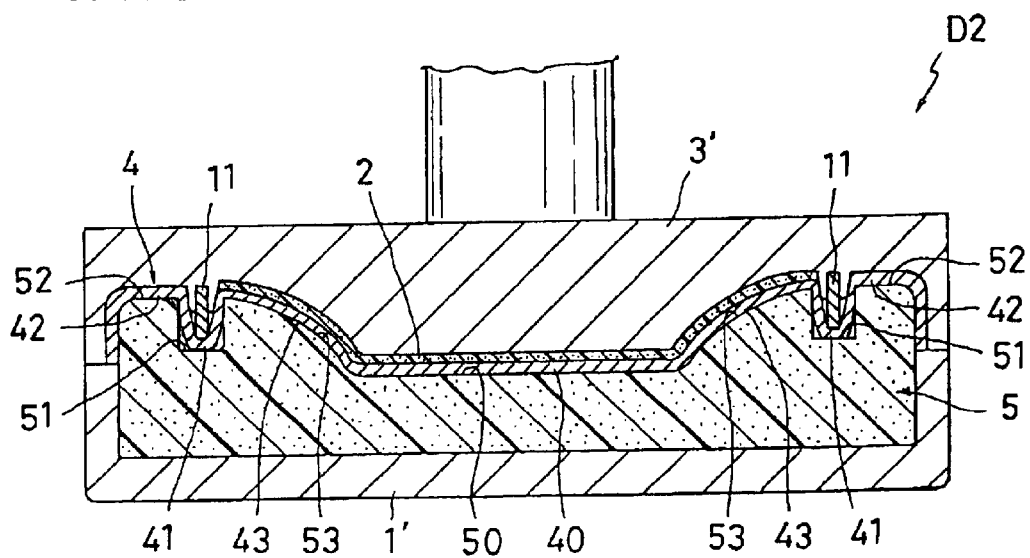
FIG. 9 is a sectional view of the thermal pressure bonding die device, wherein the trim cover assembly is shown as having been pressed against the uneven surface of foam cushion member between the upper and lower dies.

The protection element (2) described above may be used in such a thermal pressure bonding die device (D2) shown in FIGS. 8 and 9. which is operable to pressingly and adhesively bond one piece of trim cover assembly (4), while applying heat thereto, to the uneven surfaces of foam cushion member (5). In this mode, the die device (D2) comprises a lower die (1') and an upper die (3') movable vertically to and from the lower die (1'). As shown, the lower die (1') has an flat die surface for receiving the foam cushion member (5) thereon, whereas the upper die (3') has an uneven die surface generally conforming to the outer uneven surfaces of foam cushion member (5) (which generally corresponds to that of the lower die (1) of the aforementioned thermal pressure die device (D1)). Namely, the upper die (3') includes a protuberant die surface area (3'A) defined centrally thereof; a pair of recessed die surface areas (3'B) (3'B) formed symmetrically relative to the protuberant die surface area (3'A); and a generally U-shaped projection (11) erecting and extending on and along the peripheral end portion thereof. That is, while only shown in the cross-section in FIGS. 8 and 9, it is to be seen that the upper die (3') has a protuberant die surface area (3'A) to mate with the recessed portion (50) of cushion member (5); a pair of recessed surface areas (3'B) (3'B), each being to mate with the respective two bolster side portions (53) (53) of cushion member (5); and a generally U-shaped projection (11) to mate with the generally U-shaped groove (51) of cushion member (5). Though not shown, a heater or suitable heating device is incorporated in the upper die (3') or both upper and lower dies (3') (1').

Likewise as in the foregoing die device (D1), the protection element (2) is fixedly attached on the whole local area of upper die (3') surrounded by the U-shaped projection (11), such as to overlie all of the central protuberant die surface area (3'A) and two recessed die surface areas (3'B) (3'B). In the present embodiment, such fully overlying of the protection element (2) is preferable, but in the case where no such U-shaped projection (11) is provided in the die device (D2), the protection element (2) may be reduced in size relative to the illustrated one and fixed on a more limited local die surface area of the upper die (3') which will mate with the corresponding surface areas of foam cushion member (5) to intensively give a tension to the trim cover assembly (4).

In operation, an adhesive agent (6) is applied to the uneven surfaces of cushion member (5), and then, as indicated by the arrow of FIG. 8, the upper die (3') is lowered to press the initial flat state of trim cover assembly (4) against the cushion member (5) placed on the lower die (1') while heat is being applied thereto, so that the predetermined local regions of trim cover assembly (4) are extended and bonded to the uneven surfaces of cushion member (5) in conformity therewith as shown in FIG. 9. In this case also, the elasticity and heat insulation property of the protection element (2) effectively reduces great impact and heat affection given to the decorative surfaces of trim cover assembly (4). Accordingly, all such decorative projections (43) formed in the outer surfaces (4A) of trim cover assembly (4) are protected against collapse due to both pressure and heating. Of course, this is true of any otherwise textured surface of trim cover assembly (4), and for instance, all raised fibers in the gigged surfaces used in the trim cover assembly (4) are protected by the protection element (2) against bending, or a geometric patterns formed on the trim cover assembly (4) are protected by the element (2) against any objectionable deformation.

As appreciated from the foregoing, in accordance with the present invention, a protection element (2) of elastic and heat insulation property is provided at an uneven die surfaces of thermal pressure dies to thereby prevent deformation of the decoratively textured surface of trim cover assembly being subjected to thermal pressure molding process. Hence, with such arrangement of dies, it is possible to form a resulting seat with unchanged good decorative surfaces. In addition, the protection element (2) has only to be fixed on the die and therefore may be applied directly to any other conventional kinds of thermal pressure die devices.

Finally, it should be understood that the present invention is not limited to the illustrated embodiments, but any other modifications, replacements and additions may be applied thereto without departing from the scopes of the appended claims.

What is claimed is:

1. A thermal pressure die in combination with a trim cover assembly for automotive seat, said thermal pressure die being designed to heat and press said trim cover assembly and comprising:

a first die means including an uneven die surface;

a second die means including an uneven die surface region which corresponds to said uneven die surface of said first die means, said second die means being normally positioned away from said first die means to allow said trim cover assembly to be placed between said first and second die means, and being also movable toward said first die means so as to cause the uneven die surface of the former to engage the uneven die surface region of the latter, thereby giving a pressure and heat to said trim cover assembly placed between the first and second die means; and a protection means having an elastic and a heat insulation property, said protection means being fixedly arranged on either of said uneven die surface of said first die means and said uneven die surface of said second die means so as to reduce great impact and heat affection being given to loca areas of said trim cover assembly during engagement of said first die means with said second die means which gives the pressure and heat to the trim cover assembly.

2. The thermal pressure die as defined in claim 1, wherein said protection means comprises a protection element in a sheet form, which is fixedly attached on said uneven die surface.

3. The thermal pressure die according to claim 2, wherein said protection element is formed from urethane foam material.

4. The thermal pressure die according to claim 3, wherein said urethane foam material is in form of one unitary sheet having about 2 mm thickness.

5. The thermal pressure die as defined in claim 1, wherein a projection is so formed on said uneven die surface as to surround a part of said uneven die surface, said projection being adapted to form a decorative groove in said trim cover assembly, and wherein said protection means is provided on said part of said uneven die surface surrounded by said projection.

6. A thermal pressure die in combination with a trim cover assembly for automotive seat, said thermal pressure die being designed to heat and press said trim cover assembly and comprising:

a first die means including an uneven die surface;

a second die means on which said foam cushion member is to be placed, wherein said foam cushion member has an uneven surface corresponding in contour to said uneven die surface;

said first die means being normally positioned away from second die means to allow said trim cover assembly to be placed between said first and second die means, and being also movable toward the second die means in which said foam cushion member is placed, so as to bring the uneven die surface of the first die means to engagement with the uneven die surface of said foam cushion member, thereby giving a pressure and heat to both said trim cover assembly and said foam cushion member; and a protection means of elastic and heat insulation property, said protection means being fixedly arranged on the uneven die surface of said first die means so as to reduce great impact and heat affection being given to local areas of said trim cover assembly and said foam cushion member during engagement of said first die means with said second die means which gives the pressure and heat to both said trim cover assembly and said foam cushion member.

7. The thermal pressure die as defined in claim 6, wherein a projection is so formed on said uneven die surface of said first die means as to surround a par of said uneven die surface, said projection being adapted to form a decorative groove in both of said trim cover assembly and said foam cushion member, and wherein said protection means is provided on said part of said uneven die surface surrounded by said projection.

* * * * *